No. 626,795. Patented June 13, 1899.
J. B. PEYRY.
GARMENT FITTER.
(Application filed Feb. 4, 1898.)
(No Model.) 3 Sheets—Sheet 2.
Fig. 3.
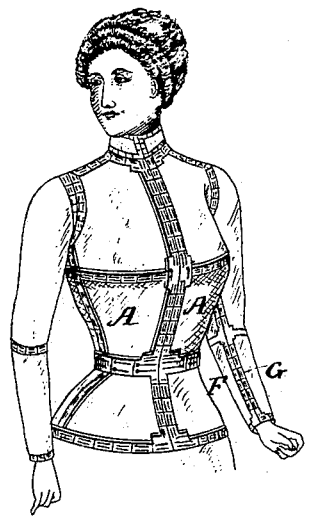
Fig. 4.
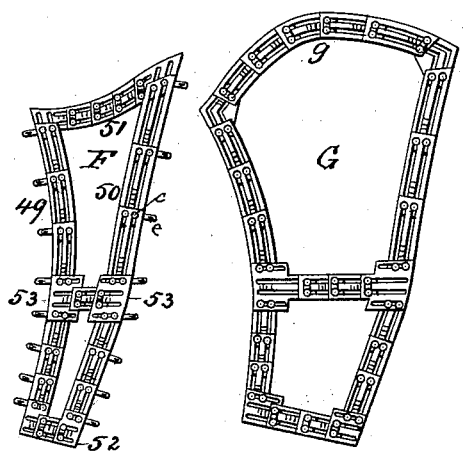
Fig. 5.
Fig. 6.
Fig. 7.
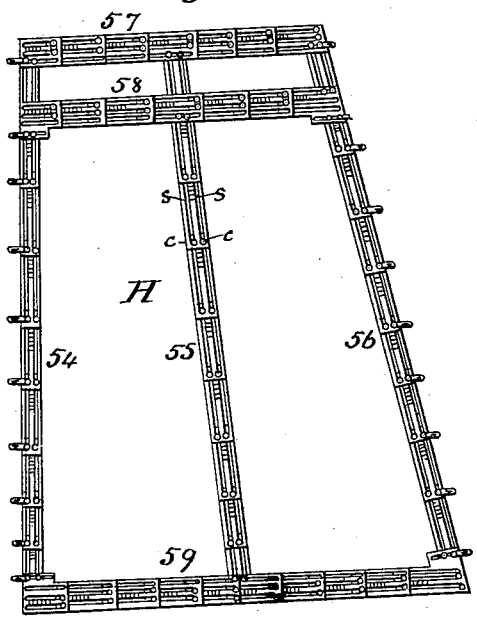
Witnesses
Inventor
Jean B. Peyry
by E. E. Masson
Attorney
THE NORRIS PETERS CO., PHOTO-LITHO., WASHINGTON, D. C.

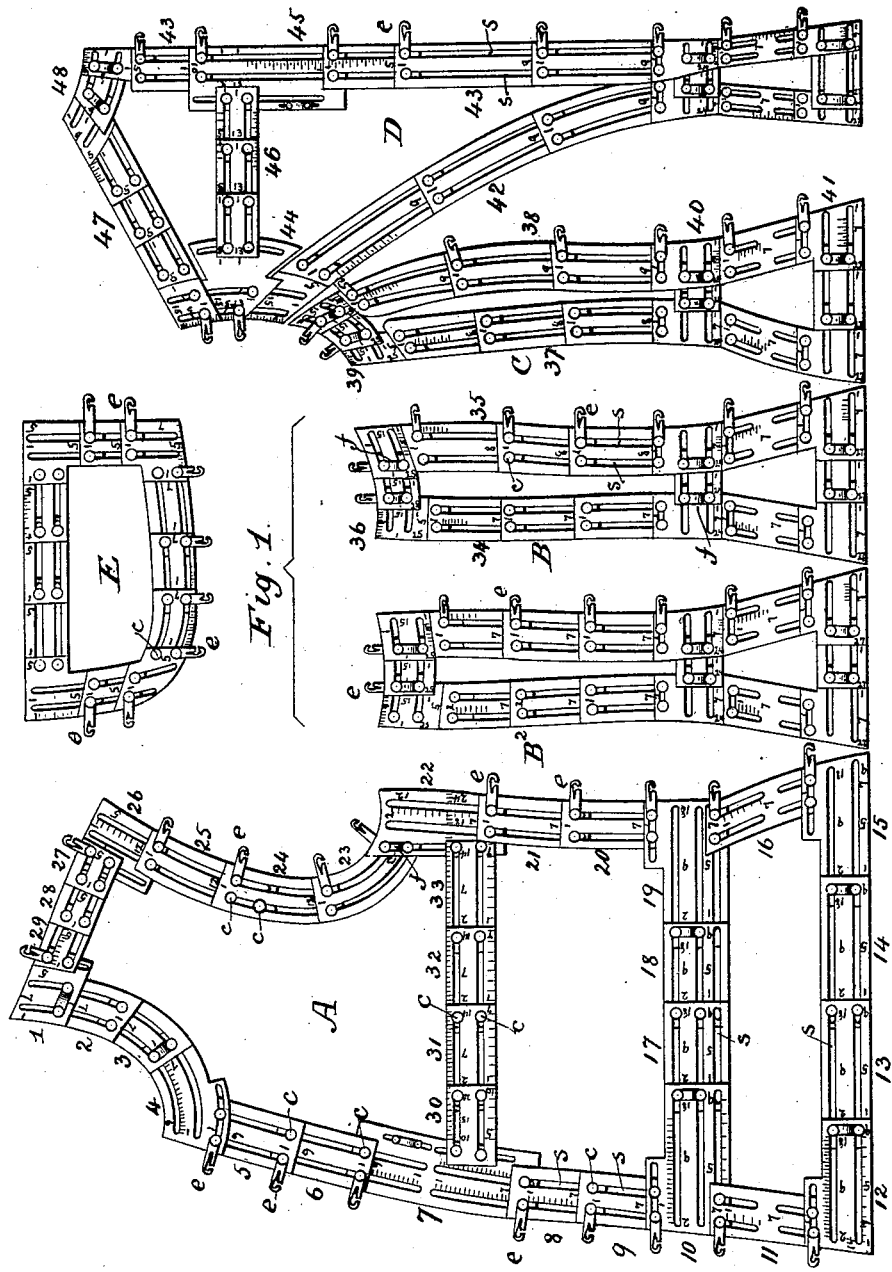

No. 626,795. Patented June 13, 1899.
J. B. PEYRY.
GARMENT FITTER.
(Application filed Feb. 4, 1898.)

(No Model.) 3 Sheets—Sheet 3.

Witnesses
A. B. Digger
E. C. Wideman

Inventor
Jean B. Peyry
by E. E. Masson,
Attorney

UNITED STATES PATENT OFFICE.

JEAN B. PEYRY, OF NEW ORLEANS, LOUISIANA.

GARMENT-FITTER.

SPECIFICATION forming part of Letters Patent No. 626,795, dated June 13, 1899.

Application filed February 4, 1898. Serial No. 669,085. (No model.)

*To all whom it may concern:*

Be it known that I, JEAN B. PEYRY, a citizen of the Republic of France, residing at New Orleans, in the parish of Orleans and State of Louisiana, have invented certain new and useful Improvements in Garment-Fitters, of which the following is a specification, reference being had therein to the accompanying drawings.

My invention has relation to conformators or garment-fitting devices composed of connectable and detachable sections or frames which are first connected together and fitted to the person by first contracting or expanding (as the case may be) and in small degree both the length and the width of each section and clamping together the members of each section, and then each section is laid out flat upon the fabric from which the pattern or outline of the parts of the garment is to be cut; and the objects of my invention are to produce a device consisting of a series of plates doubly slotted and doubly pivoted at each end to other plates, by means of which a person is enabled to take and retain with the same instrument the form of another person of any size—for example, between eight and eighty inches waist—and to give to each portion of the device either a concave, a straight, or a convex outline and maintain said outline until it has been followed and marked upon the fabric from which the pattern or the garment is to be cut. I attain these objects by means of a device made of a series of patterns adapted to be linked together, each pattern consisting of superposed links doubly slotted and doubly hinged or linked and clamped together, permitting each link to be diagonally braced to the adjacent links, as illustrated in the accompanying drawings, in which—

Figure 8:
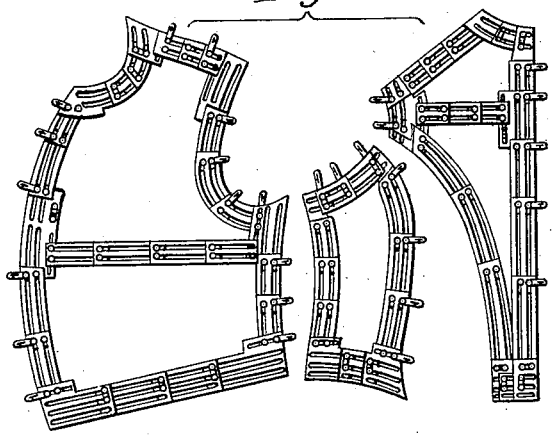
Figure 10:
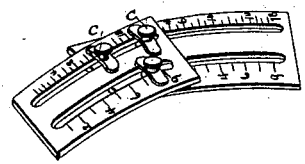
Figure 11:
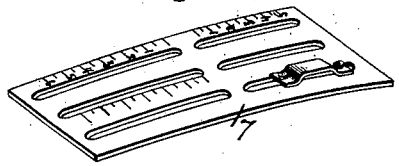
Figure 9:
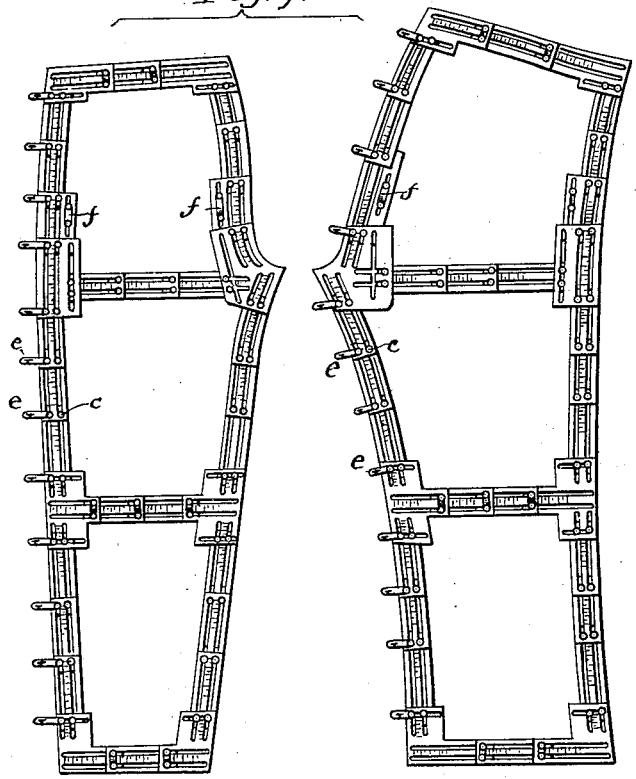
Figure 12:
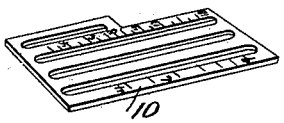
Figure 13:
Figure 14:
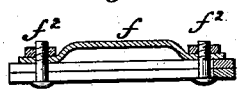
Figure 15:
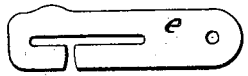

Figure 1 is a plan view of the series of patterns or frames used for fitting one-half of the waist of a stout person, said frame being constructed in accordance with my invention. Fig. 2 is a plan view of an adjustable frame for fitting one-half of the waist-collar. Fig. 3 is a front view of body and sleeve form of the fitting device embodying my invention shown applied to a woman's figure. Fig. 4 is a plan view of the frames used for fitting the inner and outer faces of one of the sleeves. Fig. 5 is a plan view of the frame used for measuring and fitting one-half of a dress-skirt in accordance with my invention. Fig. 6 represents an outlined pattern for a waist, showing the location of the darts therein. Fig. 7 represents an outline of a templet provided with scales along its edges and used to guide the operator while marking the location and shape of the darts. Fig. 8 is a plan view of a series of patterns or frames constructed in accordance with my invention and used for fitting one-half of the waist of a man. Fig. 9 is a plan view of two frames adjustably constructed in accordance with my invention and used for fitting the front and back of a pantaloons-leg. Fig. 10 is a perspective view of two consecutive sectional plates of one of the pattern-frames, on a larger scale, divergent from each other to show their adjustability relatively to each other by means of three clamps passing through their two parallel slots. Fig. 11 is a perspective view, on a larger scale, of the sectional plate from the middle of the front or breast part of the pattern-frame, showing the three sets of slots, one of which slots is provided with an arched guide to receive a tape-measure. Fig. 12 is a perspective view of the sectional pattern-frame. Fig. 13 is a longitudinal section of a portion of two consecutive sectional plates with one of the clamping devices therefor. Fig. 14 is a transverse section of two consecutive sectional plates and of the arched loop used to support and guide a tape-measure. Fig. 15 is an enlarged view of the connecting-strap *e*.

Heretofore various garment-fitting patterns have been illustrated and presented to the public; but most of them are defective because the same device cannot be used to take the form of persons varying greatly in size and because the adjustable portions cannot be maintained securely in their adjusted position without diagonal braces, which generally interfere with either the vertical or the horizontal adjustment of the patterns. Others have been provided with elastic connections, which do not retain the relative positions of the parts after they are removed from a person. With my device I am able to take the form and retain fitting-patterns for persons of any size from eight inches to more than eighty inches waist and of any height.

Each pattern consists of a series of short plates having their ends superposed, the consecutive edges of which are adapted to produce any curve that may be found on a person's body. Said short plates have two or more series of parallel slots, which permit them to be clamped together at four or more points, whereby each link is adapted to be diagonally braced to the adjacent links, and I dispense with diagonal bracing across the frame. Other advantages will be mentioned in the description of the invention in connection with the drawings.

The improved waist-fitting pattern shown on Sheet 1 of the drawings is adjusted to fit a very stout person, as it is provided with an additional or extra under-arm frame B². It consists of the breast-frame A, the under-arm frame B, the additional under-arm frame B², the side-back frame C, and the back-frame D. Each one of these frames consists of a series of short plates provided with at least two parallel slots s lengthwise thereof. Said plates are made of any suitable sheet metal—as steel or brass or, preferably, aluminium. They may also be made of leather, of tough cardboard—as parchment-paper—of celluloid, or other suitable flexible material and are arranged so that one end overlaps the end or edge of the adjacent plate.

In the frame A the neck portion consists of the slightly-curved plates 1 2 3 4, the latter constituting also the top plate of the front edge, under which are placed the plates 5 6 7 8 9 10, the latter constituting also one of the plates of the waistband. The frames are shown with a basque extension, which consists of the front plates 11 12, the bottom plates 13 14 15, and the rear plate 16. The waist adjustment is obtained from, besides the plate 10, the plates 17 18 19. The back edge of the frame A consists of the plates 20 21 22, the latter constituting also a portion of the edge of the arm-opening or arm-scye, which is formed in part by the curved edge plates 23 24 25 26, and from the latter are extended the plates 27 28 29, and the latter is adjustably connected to the plate 1. The plates 7 and 22 are provided with three slots lengthwise thereof and are adjustably united by means of a series of horizontally-located plates 30 31 32 33. The three slots in the plates 7 and 22 are to permit longitudinal and transverse adjustments of the plates connected therewith. The plates 10 and 19 have each one four slots for the same purpose.

Each plate is united to the adjacent plates by four clamps c, (shown in detail in Fig. 13,) consisting of a headed small bolt made to pass through any one of the slots s and a nut on its screw-threaded end and preferably a sheet-metal spring d under the nut. Pivotally mounted upon many of the small bolts of the clamps c there are short straps e, preferably of leather, provided with a buttonhole for engagement with the clamps of the pattern that is to occupy a position alongside thereof. These straps are swung over the frame out of the way of its edge when the pattern is ready to be marked upon the fabric. The under-arm frame B consists of two series of double-slotted plates 34 35, connected together and united at the top by a series of double-slotted plates 36 and at the waist and bottom by a series of triple-slotted plates. The additional under-arm frame B² is similar to the frame B, except that the top connecting-plates are slightly less curved than the plates 36 of the frame B.

The side-back frame C consists of two series of double-slotted plates 37 38, connected together at the top by a series of double-slotted and curved plates 39 and at the waist and bottom a series of triple-slotted plates 40 and 41.

The back-frame D consists of two series of double-slotted plates 42 43, having in its widest portion the triple-slotted plates 44 45, united by a series of double-slotted plates 46, and above them the series of double-slotted shoulder-plates united at the neck to the uppermost back-plate 43 by a series of double-slotted curved plates 48. The collar-frame E consists also of a series of double-slotted plates clamped together, so as to be adjustable in both its length and width.

To obtain the proper patterns for each sleeve, two frames are employed. The frame for the under side is shown at F, and the outer frame is shown at G in Fig. 4. The frame F consists of a series of double-slotted plates 49 and 50, united at the top by a series of double-slotted plates 51, at the bottom by a series of treble-slotted plates 52, and about the elbow by quadruple-slotted plates 53 and intermediate double-slotted plates to permit any desired adjustment both lengthwise and across. The sleeve outer frame G consists of substantially the same arrangement of double-slotted and quadruple-slotted plates, but the upper plates g have a different convexity. The same kind of slotted plates and clamps therefor are used to obtain the skirt-pattern H. (Shown in Fig. 5.) At the front are a series of double-slotted plates 54, at the side are a series of double-slotted plates 55, and at the rear are a series of similarly-slotted plates 56. They are united together at the top or belt line by a series of triple-slotted plates 57, at the hips-line by a similar series of triple-slotted plates 58, and at the bottom by a similar series of triple-slotted plates 59, the end plates having an extra slot to permit the vertical and horizontal adjustments of the series of plates of which the skirt-pattern is made.

An outlined pattern for a waist is shown in Fig. 6. It may be of paper or it may be of textile material, and upon it is marked a line 60, corresponding with the bottom edge of the breast-plates 30 31 32 33 of the pattern A, and a second line 61, corresponding with the bottom edge of the belt-plates 17 18 19 of the pattern A, and if a basque is used the bottom line of the plates 13 14 15 is indicated to locate the bottom of the darts, and following substantially the usual practice, but with the use of the templet 64, (shown in Fig. 7,) the darts 62 and 63 are marked and afterward cut out of the material. The templet 64 is either of sheet metal or of tenacious cardboard or of the same material as the pattern-frame. It has one edge at right angles with its ends, but the opposite edge is substantially in the form of a concave parabola, and upon its face are printed the consecutive divisions of a meter—viz., centimeters and their fractions—said subdivisions being preferred to inches as being smaller, and on the ends are divisions corresponding in size with the divisions marked upon the plates of the frames.

In Fig. 8 the invention is shown applied to the construction of adjustable patterns suitable for use in fitting one-half of the waist of a man. They consist of the breast-frame, the side-back frame, and the back-frame. These frames consist of a series of double-slotted, triple-slotted, and quadruple-slotted plates adjustably retained together by means of suitable clamps, substantially as heretofore described in relation to Fig. 1.

In Fig. 9 the invention is shown applied to the construction of two adjustable patterns suitable for use in fitting both the front and back frames employed in making one pantaloons-leg, these frames consisting of double and treble slotted plates adjustably retained together by means of suitable clamps c, many of said clamps having pivotally mounted thereon a series of short straps or links e, preferably of leather, to temporarily unite the frames to each other. Said links have, as clearly shown in Fig. 15, a slot lengthwise thereof to permit adjustment therewith and a transverse slot leading into the long slot for the admission of the clamping-bolt without disconnecting said bolt from the frames. The majority of the small double or treble slotted plates used in preparing the various frames described above are provided with numbered scales, as shown also in Figs. 10, 12, and 13, generally carrying the same numerals repeated on each plate.

A series of the slotted plates are provided with arched loops $f$, through a series of which a tape-measure can be passed along while taking the measure of a person during the time that the frames are temporarily resting upon his form. Said arched loops are placed on a line passing around the neck, under the arms, and encircling the chest, also on a line encircling the waist and one encircling the hips. In the pantaloons-frames said arched loops are on lines encircling the waist, the hips, the knees, and the bottom. The arched loops $f$ are made, preferably, of a strip of metal or material out of which the slotted plates are made and are secured thereto at each end by means of bolts $f^2$.

Each plate of which the frames are constituted is connected at each end by two clamps to the adjacent plates. By this construction one of the clamps can be used as a substantially immovable pivot, while the companion clamp is slackened, and the edges of the plates are made to assume an angle or a curve, as shown in Fig. 10, after which their new position is again doubly secured by screwing tightly its head-nut. Each plate is also provided with two scales having divisions of different sizes embossed thereon and shown on a larger scale in Figs. 10, 11, and 12. The scale having large divisions is to represent, preferably, centimeters, (but may be inches or other well-known scale,) and the sum total of the centimeters exposed, for example, on the plates 30, 31, 32, 33, besides the measured widths of the uncovered plates 7 and 22, will give the bust-measure of the breast-frame A; but the upper scale of finer divisions on said plates is to guide the operator to adjust the conformator, said scale being fractions of centimeters arranged according to the length and number of double-slotted plates used for the width of each frame. This provision of two scales is particularly useful, for example, on the plates 46 of the back, as the relation of the divisions of the two scales on the same plate makes it apparent at a glance to persons accustomed to the use of said frames that the person measured is either of normal form or possesses a full chest and small back or a hollow chest and arched back, as the case may be.

To properly and quickly take the measure of a person, ascertain the form and transfer it upon either paper or upon textile material from which a whole garment or part thereof is to be cut. For example, in connection with the frames shown in Fig. 1 I first take with a tape-measure the size of the bust, waist, and hips, or one-half thereof to the middle of the back, and will suppose that I find thirty-eight inches or one hundred centimeters bust measure. I take a memorandum of said dimensions and then adjust each small double-slotted plate located at the bust, so that the number "38" of the small divisions thereon will meet the end of the adjacent plate. I repeat the operation at the waist and at the hips, and thus obtain the series of frames set to the width of the person. I then measure the front, under arm, and back, take a memorandum thereof, and adjust up and down each small double-slotted plate in these locations, so that one of their numbered divisions on each plate corresponds with the measurements first taken, and thus obtain a series of frames that can substantially be depended upon to mark patterns on paper or upon textiles; but to further insure the production of perfectly-fitting patterns the flexible frames already approximately correct are coupled to each other by means of the series of short straps or links $e$ and made to encircle the person, (or one-half thereof,) being additionally retained in position by tapes, preferably measuring-tapes, if only one-half of the frames are used, said tapes being passed under the arched loops $f$, in which positions minute adjustments of the small plates can be made, particularly if there is any deformity to be fitted or overcome. Corresponding measurements and adjustments of the double-slotted plates of the frame for the sleeves are made, and the latter can be connected to the bust-frames by means of the links $e$, carried by the latter. Corresponding adjustments can be given to the skirt-frame or to the pantaloons-frame.

Having now fully described my invention, I claim—

1. An adjustable garment-fitting device comprising a series of frames, each frame consisting of separately and independently adjustable plates, each plate having two substantially parallel slots, and means for independently securing said plates to each adjacent plate through each of said slots, whereby maximum rigidity is secured and diagonal braces are dispensed with, substantially as described.

2. An adjustable garment-fitting device comprising a series of frames, each frame consisting of separately and independently adjustable plates, each plate having two substantially parallel slots, clamping devices for independently securing said plates to each adjacent plate through each of said slots, and connecting-links pivotally mounted at one end upon the bolts of said clamping devices, each link having a longitudinal slot and a transverse slot leading therein, substantially as described.

In testimony whereof I affix my signature in presence of two witnesses.

JEAN B. PEYRY.

Witnesses:
 E. E. MASSON,
 A. B. DEGGES.